United States Patent [19]

Koishi et al.

[11] Patent Number: 5,463,639
[45] Date of Patent: Oct. 31, 1995

[54] AUTOMATIC PATTERN SYNCHRONIZING CIRCUIT OF AN ERROR DETECTOR

[75] Inventors: Tetsuya Koishi; Noboru Akiyama; Yasuto Kumai, all of Tokyo, Japan

[73] Assignee: Advantest Corporation, Tokyo, Japan

[21] Appl. No.: 234,043

[22] Filed: Apr. 28, 1994

[30] Foreign Application Priority Data

Apr. 28, 1993 [JP] Japan ................................ 5-027918 U
Sep. 28, 1993 [JP] Japan ................................ 5-057148 U

[51] Int. Cl.$^6$ ................................................ G01R 31/28
[52] U.S. Cl. ................................ 371/27.004; 364/484
[58] Field of Search ....................... 371/27, 1, 5.4, 371/16.1, 41; 364/484–489; 324/73 R; 375/59, 54, 120

[56] References Cited

U.S. PATENT DOCUMENTS

| | | | |
|---|---|---|---|
| 3,596,245 | 7/1971 | Finnie | 371/5.4 |
| 4,048,481 | 9/1977 | Bailey, Jr. et al. | 371/16.1 |
| 4,133,037 | 1/1979 | Overman et al. | 364/484 |
| 4,635,256 | 1/1987 | Herlein | 371/1 |
| 4,649,543 | 3/1987 | Levine | 371/41 |
| 4,660,197 | 4/1987 | Wrinn et al. | 371/1 |
| 4,682,343 | 7/1987 | Pfiffner | 371/43 |
| 5,014,226 | 5/1991 | Horstmann et al. | 364/489 |

Primary Examiner—Emanuel T. Voeltz
Assistant Examiner—Craig Steven Miller
Attorney, Agent, or Firm—Knobbe, Martens, Olson & Bear

[57] ABSTRACT

An automatic pattern synchronizing circuit re-times the phase differences between clocks, thereby adjusting test pattern outputs from a device under test. The automatic pattern synchronizing circuit includes a reference voltage generator for providing a threshold voltage, a comparator for converting an input signal into a rectangular signal, a flip-flop, a pattern-counter part for counting a signal from the flip-flop and a control part for setting the threshold voltage in the comparator. The automatic pattern synchronizing circuit automatically synchronizes voltage patterns. In particular, the high and low voltage levels of the input waveform are automatically measured and the optimum threshold voltage is automatically set.

7 Claims, 9 Drawing Sheets

Pattern synchronization determining signal

Pattern synchronization determining signal

FIG. 2(a) Measurement data
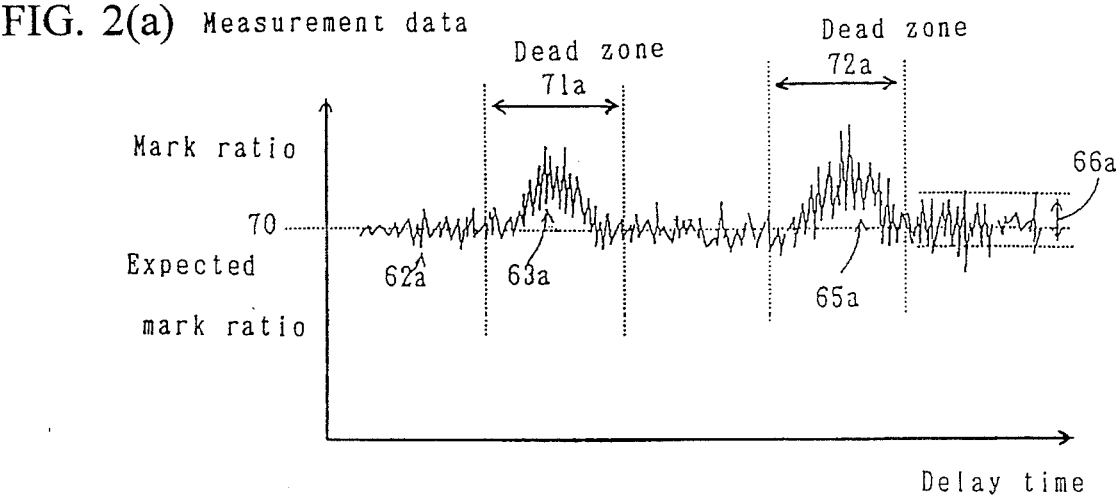
FIG. 2(b) Average mark ratio
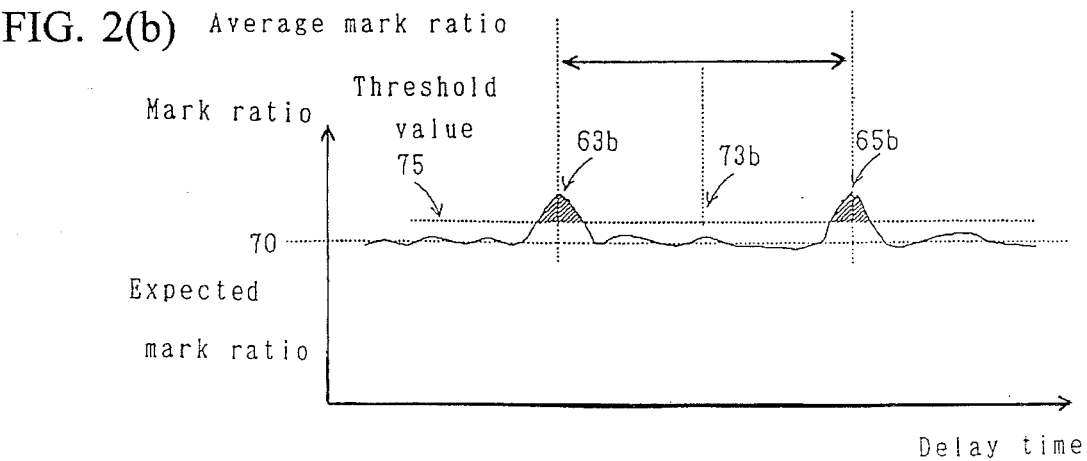

FIG. 6(a)
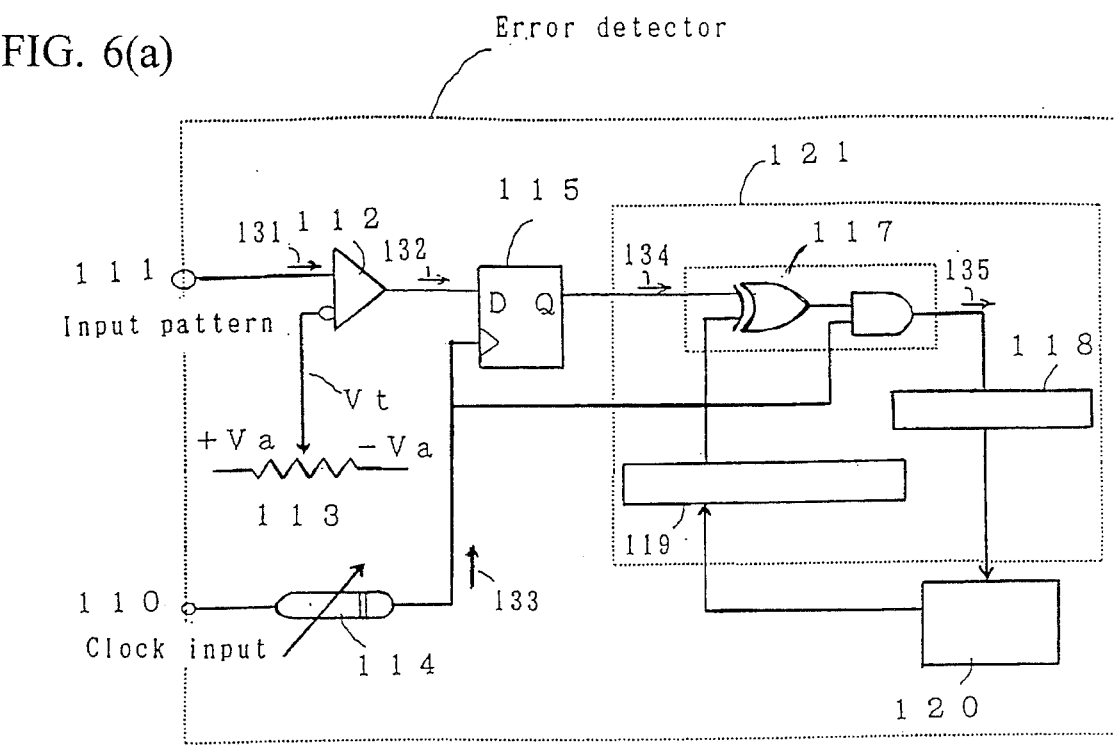
FIG. 6(b)
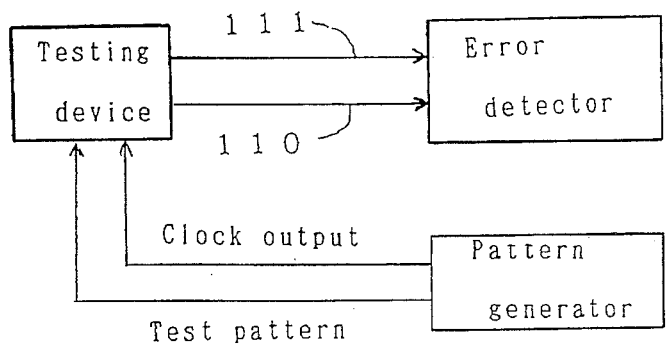
FIG. 6(c) (Diagram of operating region)
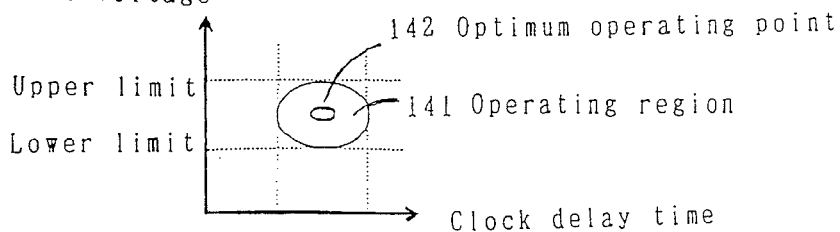

Pattern synchronization determining signal

AUTOMATIC PATTERN SYNCHRONIZING CIRCUIT OF AN ERROR DETECTOR

FIELD OF THE INVENTION

The present invention relates to a circuit which automatically synchronizes signal patterns used in error-testing equipment. In particular, the invention relates to an automatic pattern synchronizing circuit that re-times the phase differences between clocks, thereby adjusting the test pattern output from a device-under-test, hereinafter referred to as DUT.

Furthermore, the present invention relates to a circuit that automatically sets the level of a comparator that compares an unknown voltage input in an error detector to an optimum value. In particular, the invention relates to a circuit that is used for setting the threshold level of the comparator to an optimum value by automatically measuring the high and low levels of an input voltage and, based upon these measurements, setting the optimum threshold level.

BACKGROUND OF THE INVENTION

First, the method of setting the optimum threshold level for a comparator that compares an unknown voltage input in an error detector to an optimum value will be described.

As shown in FIG. 6 (b), the DUT receives the test pattern or PRBS data pattern from a pattern generator. The error detector then measures the error rate in the output pattern from the DUT.

FIG. 6 (b) also shows an example of the circuit configuration. The pattern generator is connected to the DUT and the DUT is connected to the error detector. In this configuration, the pattern generator provides a test pattern and a clock output to the DUT. Subsequently, the output from the DUT, which includes an input pattern 111 and a clock input 110, is sent to the error detector.

Conventionally, the threshold voltage of the error detector is suitably adjusted to correspond to the input voltage. This adjustment is made prior to the measurement of the input voltage by the error detector.

FIG. 6 (a) shows a configuration of a conventional error detector.

For accurate measurements, it is necessary to set a voltage Vt and a clock delay time to an optimum operating point 142, as shown in FIG. 6 (c).

There are two methods for adjusting the threshold voltage to correspond to the input pattern voltage that the DUT outputs.

One method of adjusting the threshold voltage comprises the following steps. First, pre-measurements of the high and low levels of the input pattern 111 are made utilizing a sampling oscilloscope. Next, the mesial value between the high and low levels is calculated. Finally, a variable resistor 113 is adjusted so that the threshold voltage Vt is at the calculated mesial value.

Another method of adjusting the threshold voltage, which is the preferred method, comprises the following steps. First, a pattern similar to the reference pattern 119 is supplied to the error detector instead of the input pattern 111. Next, both the variable resistor 113 and the variable delay part 114 are manually adjusted so that the error-counter 118 does not count errors. Finally, there is a search for an optimum operating point 142.

The method of searching for an optimum point will now be described. However, it should be noted that there exists an error free state, hereinafter referred to as the error free state, in which no errors are detected. The error free state corresponds to the operating area 141, shown in FIG. 6 (c). The search is conducted in the operating area and, subsequently, the optimum operating point 142 is located within the operating area.

The method of searching for the optimum point comprises the following steps. First, the variable resistor 113 and the variable delay part 114 are properly adjusted so that the voltage Vt and the clock delay time are located within the operating area 141, which is the error free state. Next, the voltage Vt is adjusted to obtain an upper limit voltage and a lower limit voltage. The upper limit and lower limit voltages define the voltage Vt range in the error free state. Finally, a mesial value between the upper limit voltage and the lower limit voltage is set as the optimum operating point 142 of Vt.

It should be noted that the Vt range also depends upon the clock delay time. However, since the Vt is set as the mesial value, the clock delay time hardly influences the Vt value.

The method of adjusting the threshold voltage requires a great amount of time, due to numerous repetitions of the above described procedure to locate the optimum operating point 142.

Referring to FIG. 6 (a), an input pattern 111 is compared to a set threshold voltage Vt by a comparator 112. The comparator 112 outputs a shaped signal 132 with definite high and low levels. Next, the shaped signal 132 is changed by the clock input 133 at the flip-flop 115, which results in restored output data 134. Further, an error comparing part 117 compares the restored data 134 to the output pattern of a reference-pattern-generating part 119. If differences between the data and output pattern are found, the clock 133 changes the error comparing part 117 to output a counting pulse 135. Finally, the output pulse 135 is counted by the error counter 118.

For this case, the reference-pattern-generating part 119 is a pattern generator used for referencing the input pattern 111 and, subsequently, generating the same pattern as the input pattern.

The phase adjustment of a pattern-synchronizing circuit used for an error-detecting apparatus will be described below. FIG. 7 shows an example of a conventional pattern-synchronizing circuit and FIG. 8 shows an example of a test configuration for a DUT 51. Referring to FIGS. 7 and 8, the conventional technology will now be described.

Referring to FIG. 8, a pattern generator 50, which is connected to a DUT 51, outputs a testing input pattern signal 53, that is already-known data, PRBS data or the like, and an input clock signal 54. The DUT, which is connected to an error-detecting apparatus 52, outputs an output pattern signal 55 and a clock signal 56 to a pattern-synchronizing circuit 10 of the error-detecting apparatus 52.

For this example, the DUT and connecting cables create a propagation delay in the output signals. This typically occurs at high frequencies (i.e. up to 10 GHz). As a result, there is a phase difference between the two types of input signals received by the pattern synchronizing circuit 10. Accordingly, signal synchronization in the circuit is not realized.

For this reason, an operator must wait until synchronization is established. Synchronization is established by manually adjusting a variable delay element 14. An example of an available variable delay element is a delay line with a resolution of 10 PS, controlled by a motor drive controller.

FIG. 7 shows an example of a conventional pattern synchronizing circuit. A pattern data 30 is input to a port of a comparator 11. Next, a voltage from a reference voltage generator 12 is input to the other port of the comparator 11 as a threshold voltage. The comparator 30 then converts the pattern 30 into a digital signal which is input to a re-timing circuit 13.

A clock 31 is applied to the re-timing circuit 13 as clock input 32 via the manual variable delay element 14. Thus, the digital signal is synchronized by the clock 32 in the re-timing circuit 13. Subsequently, the re-timing circuit 13 outputs a demodulated signal 33. At this time, however, since the output data 33 is not necessarily synchronized with a correct phase, the output data 33 is temporarily stored.

Next, the output data 33 is applied to a port of a code-error detecting circuit 16. The reference pattern data 34 originating from a reference pattern generating circuit 15 is applied to the other port of the circuit 16. Then, the circuit 16 compares the two data according to the input clock 32. If the two data are not coincident with each other, the circuit 16 outputs an error pulse 35.

Next, an error rate detecting divider 17, which is used for synchronous detection, counts the error pulses. In contrast, an error counter 18 is a real error rate measuring circuit and is not used for synchronous detection.

For this example, the error rate detecting divider 17 is also a simple error rate measuring unit. In other words, whenever more than 10 raised to the power of $-3$ errors are detected, an error pulse signal 36 is output by the divider 17.

The output data 34 from the reference pattern generating circuit 15 is delayed by only one bit from this error pulse signal 36. In other words, receipt of an error pulse 36 by control circuit 21 generates an output inhibiting pulse 37 of one clock time, which subsequently inhibits one clock pulse at a gate 22. Thus, one pulse of a clock source 38 for the reference pattern generating circuit 15 is deleted.

As a result, the reference-pattern-generating circuit 15 generates a reference pattern output which is delayed by one bit. Furthermore, this reference pattern which is delayed by one bit comprises a new data pattern which is applied to the port in the circuit 16. Once again, a data pattern comparison is made by circuit 16.

This series of operations is repeated until the synchronization of the input pattern 30 and the reference pattern delayed by one bit is completed. Thus, when an error pulse 36 does not occur in the designated set amount of time, the inhibiting control circuit 21 outputs a signal 39 that indicates that the synchronization is complete.

It should be noted that even if the clock 32 is synchronized with the output of the comparator 11, but the output 33 of the re-timing circuit 13 does not correspond to the reference pattern 34 in its bit string, then pattern synchronization is not established. Therefore, as mentioned above, the bit string is sequentially shifted by one bit until the pattern strings correspond.

Thus, pattern synchronization requires both synchronization of the clock to the output of the comparator 11 and correspondence of the bit sting of the reference pattern to the bit string of the input pattern.

For this reason, it takes a great amount of time to detect pattern synchronization. In some cases, it may be necessary to generate an inhibiting pulse for a complete cycle of the pattern length until their pattern strings correspond. For example, a bit string length of 1 Kbits requires an output of one thousand inhibiting pulses.

Hereinafter, the repetitive operation performed to detect pattern synchronization will be referred to as a pattern search operation.

FIG. 9 shows the relationship between input data 60 and input clocks 63, 64, and 65. The conventional pattern synchronization procedure will now be described.

Referring to FIG. 9, the input data 60 has a dead zone 61 that is not defined under re-timing. This zone represents a phase area wherein the influence of, for example, a transition time affecting the amplitude of the input data, a jitter in the input data, a set-up-hold time affecting the re-timing flip-flop, or a jitter in the re-timing clock itself, causes the re-timing output data to be undefined.

Hereinafter, this undefined area will be referred to as the dead zone. It should be noted that as the clock rate increases up to 10 GHz, this dead zone also expands. As a result, the acceptable range 62 contracts.

The conventional pattern synchronization procedure includes the following steps. First, the phase of the input data and the clock are adjusted, as shown by clock input 63. However, since the leading edge of the input clock 63 is positioned in the dead zone 61, the input data and the input clock 63 will not become synchronized. Even if a time period greater than a complete cycle of the input pattern passes, pattern synchronization will not occur.

Next, a variable delay element 14 is adjusted, as shown by input clock 64. Likewise, since the leading edge of the input clock 64 is also positioned in the dead zone 61, the input data and the input clock 64 will not become synchronized. Once again, even if a time period greater than a complete cycle of the input pattern passes, pattern synchronization will not occur.

However, when the leading edge of the input clock, as shown by input clock 65, is positioned in the effective permissible range 62, pattern synchronization occurs.

Since the above operation is continuously repeated until pattern synchronization is detected, a great amount of time is wasted.

Variations in ambient temperature and jitter may cause the data measured by the error test to shift to an unstable point. Thus, if the error test (used for synchronous detection) is performed in this type of setting, the timing shown by clock 65 does not necessarily provide a stable measurement.

Therefore, it is apparent that it is necessary to obtain a range of time which provides a stable operation.

The method of obtaining a range of time comprises the following steps. First, the variable delay element 14 is adjusted so as to obtain two clock delay times wherein pattern synchronization is realized. Next, the delay time of the variable delay element 14 is set at a point located in the middle between the two delay times. This point is known as the optimum operating point. Once this is accomplished, as actual stable error test can be performed.

The round time of the input pattern is defined as the pattern length that an operator sets in the pattern generator 50, shown in FIG. 8. For example, a PRBS pattern of 23 bits has a pattern length of 2 to the 23rd power. The minimum time required to perform a pattern-searching operation one time for a pattern rate of 10 GHz, is about 10 seconds [which is 2 to the 23rd power × 10 to the third power × clock time (i.e. 10 to the ninth power)]. Thus, conventional pattern synchronization procedures involving multiple adjustments of the variable delay element require a greater amount of time than the round time.

Further, conventional pattern-synchronizing operations should be performed whenever the conditions of either a clock or a pattern data for an actual error test is changed. Whenever an operator changes an output condition of a pattern generator, the above mentioned procedure must be performed. In addition, a search for the optimum operating point must also be performed, thereby making the above described procedures undesirable.

SUMMARY OF THE INVENTION

Traditionally, the optimum operating point of the voltage Vt is set by first, obtaining the high and low levels of a testing input voltage utilizing a sampling oscilloscope, next, calculating a mesial value between the high and low levels, and, finally, setting the voltage Vt to the mesial value by manual adjustments to a variable resistor. The optimum operating point of the voltage Vt can also be obtained through multiple adjustments to the variable resistor and the delay-variable part of the circuit.

The object of the present invention is to automatically set the threshold voltage Vt to a desired value utilizing an internal testing waveform.

The error detector of the present invention, which is used to set the threshold level, comprises a reference voltage generator 116 that supplies an arbitrary threshold voltage, a comparator 112 that converts an input analog voltage signal into a digital signal, a flip-flop 115 used for re-timing, a pattern-counter 121 that counts existing signals, and a control part 120 that controls the above mentioned parts.

The output of the reference voltage generator is connected to an input of the comparator. Further, the output of the comparator is connected to an input of the flip-flop, and an output of the pattern counter is connected to an input of the control part.

Moreover, the internal configuration of the pattern-counter comprises a reference pattern-generating part 119, an error-comparing part 117, and an error counter 118. The output of the error-comparing part is connected to an input of the error-counter; the output of the error-counter is connected to an input of the control part; and, the output of the reference pattern-generating part is connected to an input of the error-comparing part.

According to the present invention, since the reference voltage generator 116 can generate arbitrary voltages from the control part utilizing a D/A converter, it can also arbitrarily change the threshold voltage of the comparator 112. For this reason, an analog amplitude of an input pattern can be converted into a digital signal consisting of high and low signals.

The reference pattern-generating part 119 and the error comparing part 117 have direct input to the error-counter 118 and, thus, affect the error count. In other words, the error-counter 118 can be adjusted to count the number of times that the restored data 134 is high or the restored data 134 is low.

As previously described, a great deal of time is required to operate a delay element and to search for an optimum operating point whenever system conditions are changed. Moreover, it is inconvenient for an operator to repeatedly perform the above operation. Further, multiple repetitions of the pattern search operation may result in a resetting mistake.

Thus, the second objective of the present invention is to automatically detect synchronized patterns, to obtain an optimum operating point in a short amount of time, and to automatically set the optimum operating point.

The automatic pattern synchronizing circuit of the present invention used in an error detector comprises a reference voltage generator 12 whose output is applied to the end of a comparator 11 as an arbitrary threshold level; a variable delay element 14; an error counter 18 which counts a mark rate per unit time; a gate 19 which inhibits the output of a reference pattern generator 15; and, a controlling part 23. Further, the reference voltage generator 12 is controlled by the controlling part 23, which automatically performs a series of the above described pattern-synchronizing detection procedures.

The method of utilizing the present invention comprises the following steps of: measuring the amplitude of the input pattern by changing the threshold level of the comparator 11; optimizing the threshold level of the comparator 11 to easily detect the mark rate; measuring the mark rate per unit-delay-time utilizing the error counter 18, with the variable delaying-element 14 increased or decreased by a unit-delay-time and with the output of the reference pattern generator 15 inhibited by the gate 19; detecting two peak points obtained from the measured mark rate data, which defines a dead zone; setting the delay time of the variable delay element 14 to the middle of the two peaks points; and, finally, automatically synchronizing the signal pattern and the clock utilizing the controlling part 23.

Further, according to the present invention, the threshold level is set by applying the output of the reference voltage generator 12 to the comparator 11, thereby making variations in the mark rate in the dead zone conspicuous.

In addition, inhibition of the output of the reference pattern generator 15 enables the error counter 18 to measure the mark rate of the input pattern.

Unlike conventional pattern-searching operations, the present invention, which measures only the mark rate per unit time, requires a minimal amount of time to confirm pattern synchronization. Further, the present invention enables the determination of two dead-zones from a data distribution of the mark rates. From this, a middle value of the two dead-zones can be easily set as the optimum operating point.

BRIEF DESCRIPTION OF THE DRAWINGS

FIG. 2 (a) shows a diagram of the measured mark rate data that is measured by changing the delay time.

FIG. 2 (b) shows a diagram of the measured mark rate data that is processed by the calculation of the second embodiment of the present invention.

FIG. 5 (b) is a flow chart of the steps used in the determination of Vt.

FIG. 6 (a) shows a conventional circuit used in an error detector.

FIG. 6 (b) shows a measurement block diagram.

FIG. 6 (c) shows a diagram of the operating region defined by the Vt voltage and the clock delay time.

DESCRIPTION OF THE PREFERRED EMBODIMENTS

Figure 4:
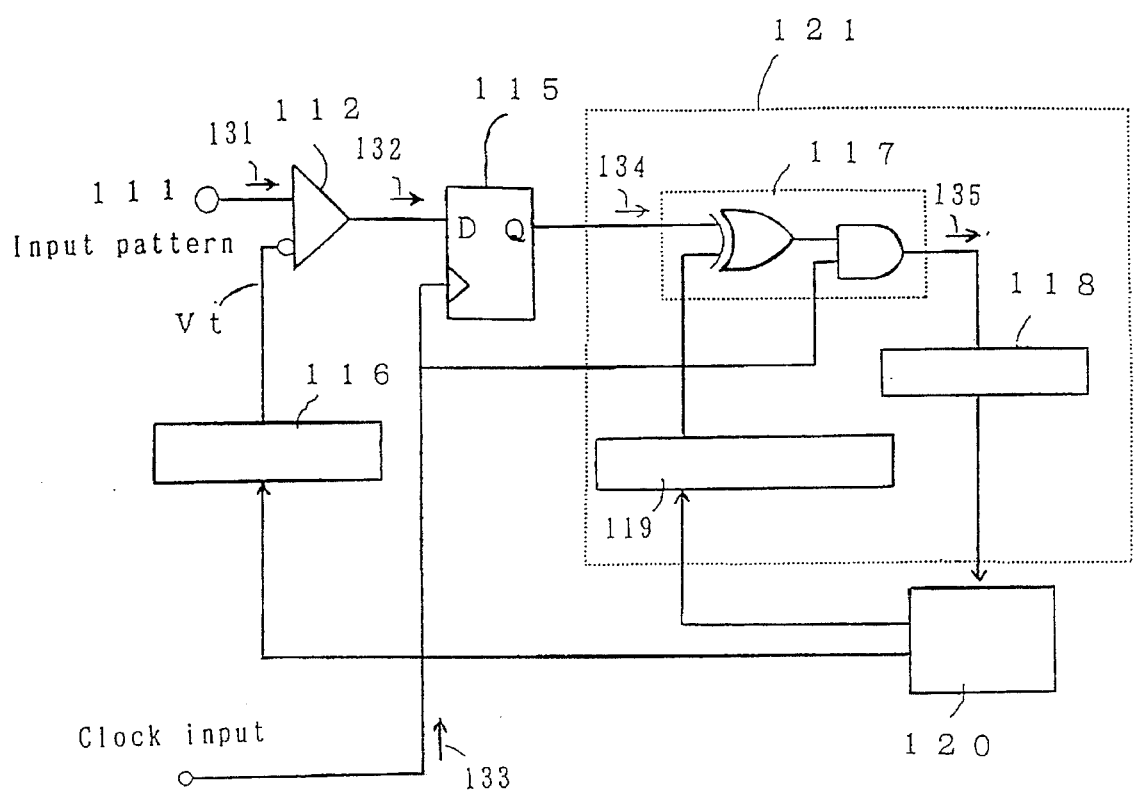
FIG. 4 is a circuit diagram of the second embodiment of the present invention.
Figure 5A:
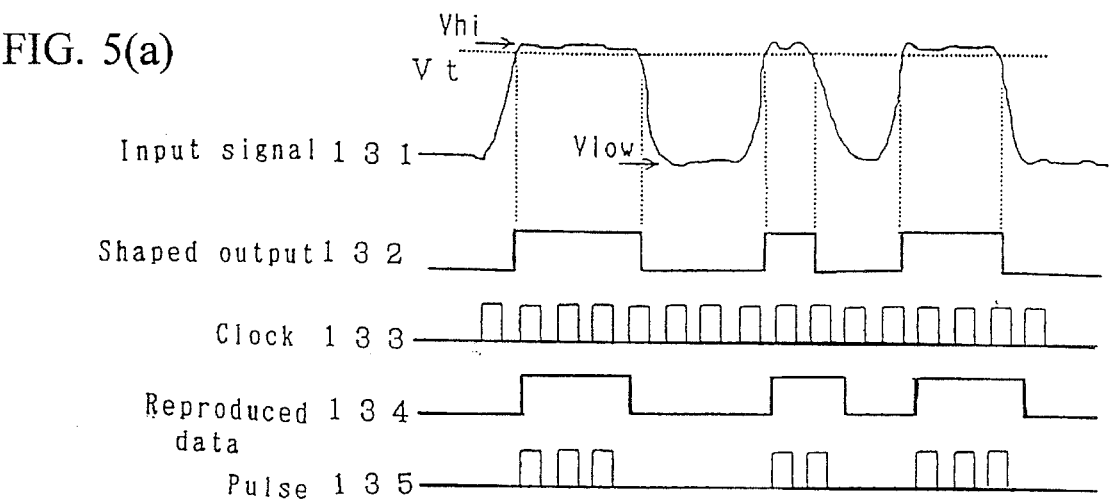
FIG. 5 (a) shows a timing diagram of the first embodiment of the present invention.
Figure 5B:
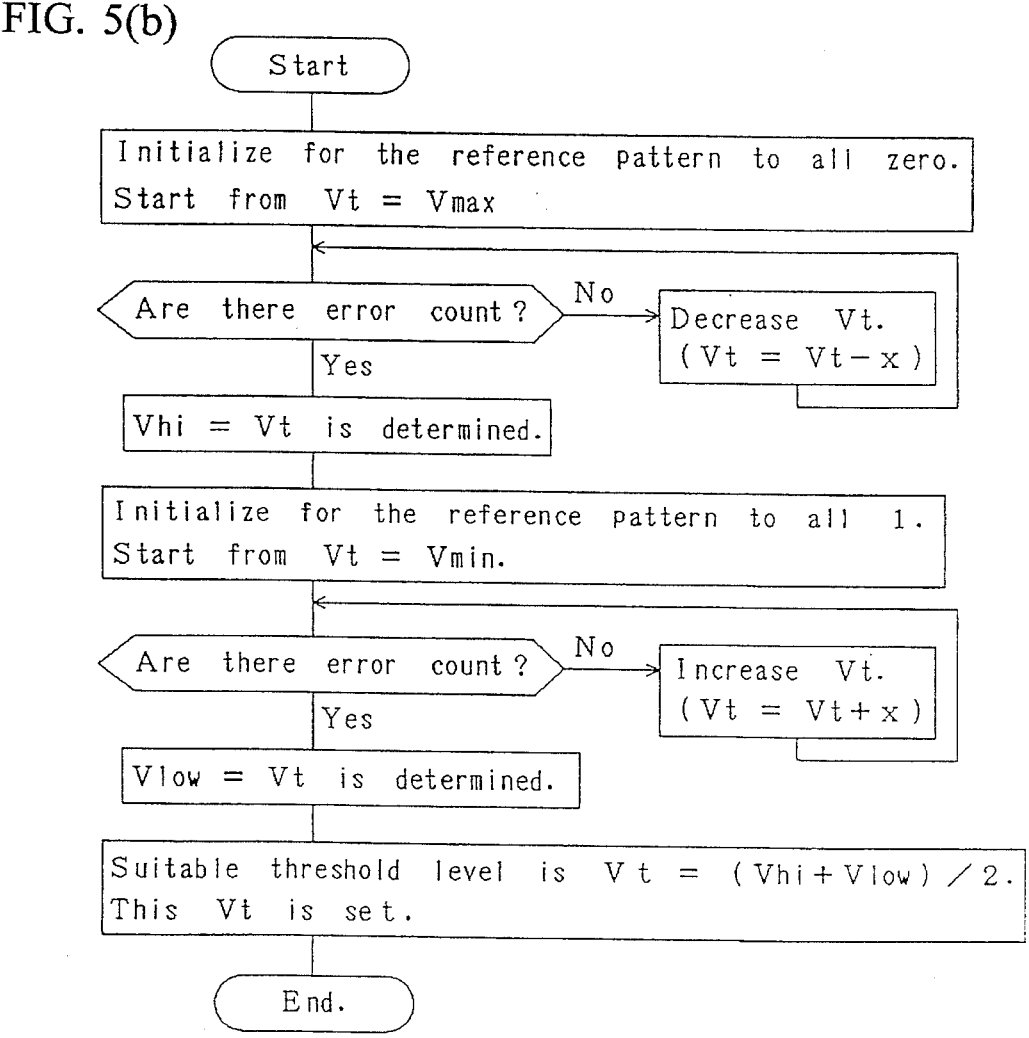
Figure 7:
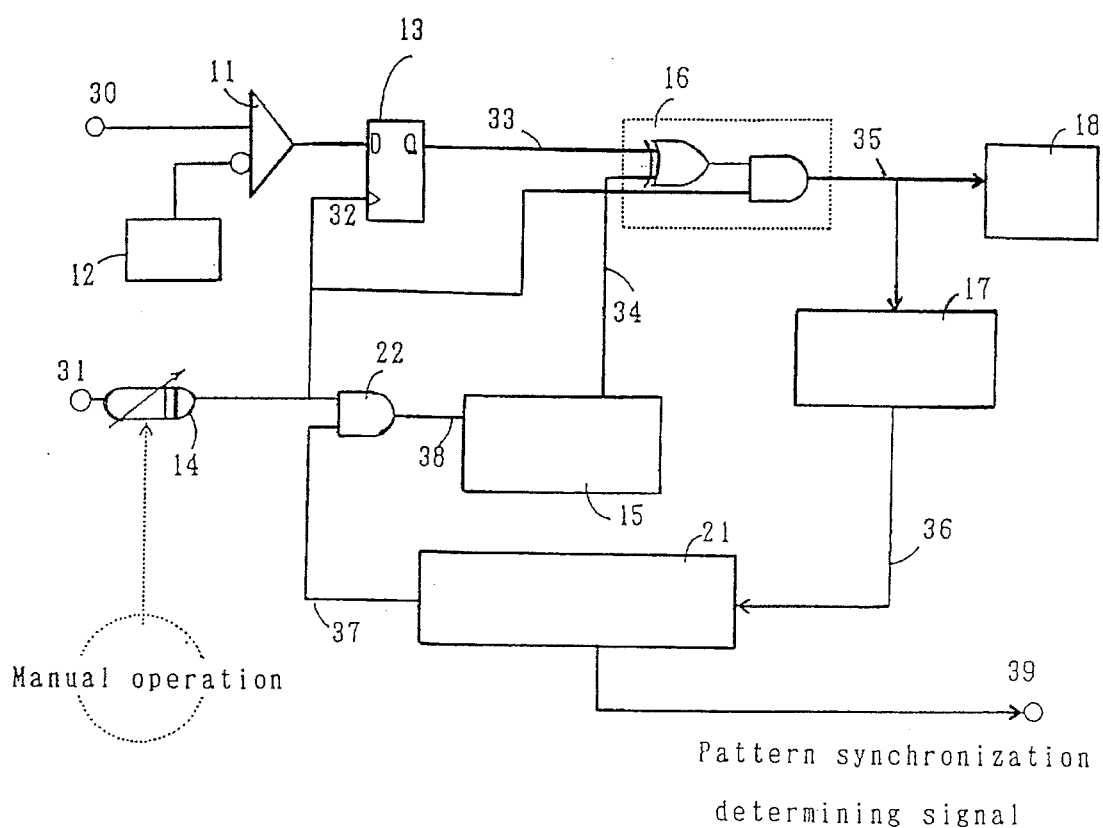
FIG. 7 illustrates one embodiment of a conventional pattern-synchronizing circuit.

Referring to FIGS. 4 and 5, the first embodiment of the present invention will now be described. A reference voltage generator 116 generates any voltage Vt utilizing a software controlled D/A converter. The generating range of the voltage Vt is sufficiently greater than the external input voltage range (for example, −2 v to +2 v).

Two lines of external signals are connected to the error detector. One line is connected to a clock input terminal. The clock signal is generated by a testing device or external pattern generator. The other line is connected to a pattern input terminal of the error detector. The input pattern signal is generated by a testing device and received by the error detector. Any pattern is available for the input pattern signal.

A flip-flop 115 is required to re-time the actual measurements for the error detector. For this invention, re-timing adjustments by the flip-flop 115 are only made to the output signal.

The operation of searching for the optimum value of the Vt voltage will now be described using the flow chart shown in FIG. 5 (b). First, the high level voltage of the input pattern signal is measured. In order to measure the high level voltage, the reference output pattern of the pattern generator 119 must be initialized at a fixed logic pattern of zero. It is necessary to set the logic of the reference pattern at zero, since the output counting pulses 115 are counted by an error counter only when the input signal voltage is higher than the Vt voltage of a comparator 112.

Next, the measurement of the input voltage is set at Vt equals Vmax. The set point of the starting threshold voltage Vt(Vmax) of the comparator is sufficiently higher than the input signal voltage 131. For this starting condition, the shaped output voltage 132 is always LOW. Additionally, the output data 134 of the flip-flop 115 is also LOW. Thus, an output pulse 135 is not generated and, subsequently, is not counted by the error counter 118.

Next, pulses are counted by the error counter while the Vt voltage is decreased by increments of one unit of resolution utilizing the D/A converter. During this cycle of counting the pulses and decreasing the Vt voltage, when the Vt voltage changes to the Vhi voltage, then the shaped output voltage 132 changes from the low level voltage to the high level voltages, as shown by the timing diagram in FIG. 5 (a). Additionally, when the output voltages 134 of the flip-flop are converted to pulses by the clock 133, then the pulses 135 are output from the error comparison part. The counting of the output pulses by the error counter 118 begins the counting sequence. The Vhi of the high level voltage of the input pattern is determined utilizing the Vt voltage. Therefore, Vhi=Vt is given. Next, the low voltage of the input pattern signal is measured, as shown in the flow chart of FIG. 5 (b). In order to measure the low level voltage, the output pattern of the reference pattern generator 119 is initialized at the fixed logic pattern of 1. Next, the voltage of the input pattern is searched utilizing the method of counting and increasing the pulses, similar to the method used to determine the Vt voltage, until the Vlow voltage is determined.

Therefore, the optimum value of the Vt threshold voltage is determined by calculating a middle voltage point located between the Vhi voltage and the Vlow voltage. The calculated middle point voltage is set as the optimum operating point 142, thereby completing adjustments to this invention. The present invention is not limited to the above described procedure and configuration, but also includes a display function to display the determined Vhi and the Vlow voltage values.

The present invention comprises the above-described adjustment method and the circuit block diagram shown in FIG. 4. The high level voltage Vhi and the low level voltage Vlow of the input voltage are automatically determined by the software prior to any measurements made by the error detector. Thus, the process of manual measuring, adjusting and setting the optimum value of the threshold voltage is reduced.

In addition, the reference voltage generator does not need to generate a pattern similar to the testing pattern of the DUT. Therefore, any pattern is available to be used for the testing pattern of the DUT. Subsequently, changes to the initial measurement conditions for the DUT do not occur prior to the adjustment procedure.

In the past, the operation of a combination variable resistor and variable delay line part required adjustments to be made during the searching procedure. For this reason, a dispersion error due to human error introduced during this operation was included. However, the adjustment procedure for the present invention is automatically made by the software and, subsequently, a stable setting of the optimum value is made. Therefore, stable results and high reliability measurements can be excepted.

In addition, if testing conditions change which effect the output voltage of the DUT, the optimum value of the threshold voltage is easily reset via the controller.

Figure 1:
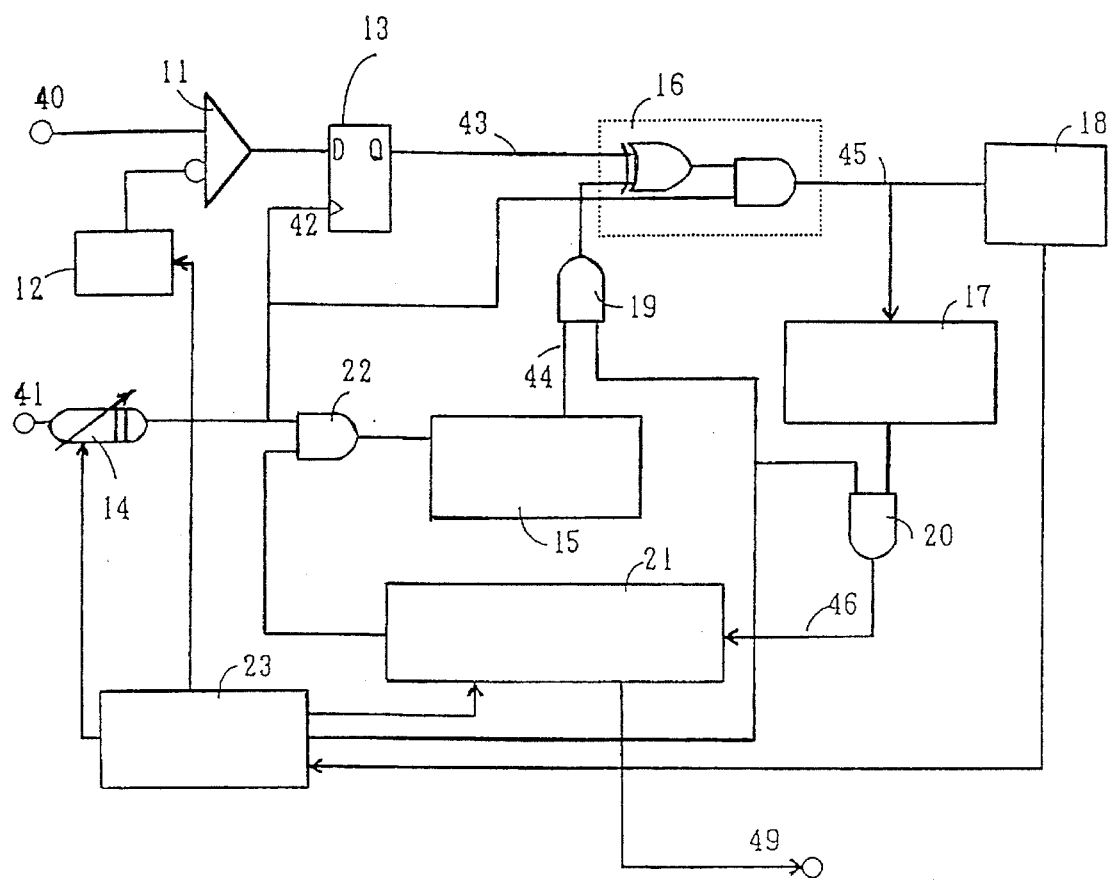
FIG. 1 is a diagram that shows an automatic pattern-synchronizing circuit of the second embodiment of the present invention.
Figure 3:
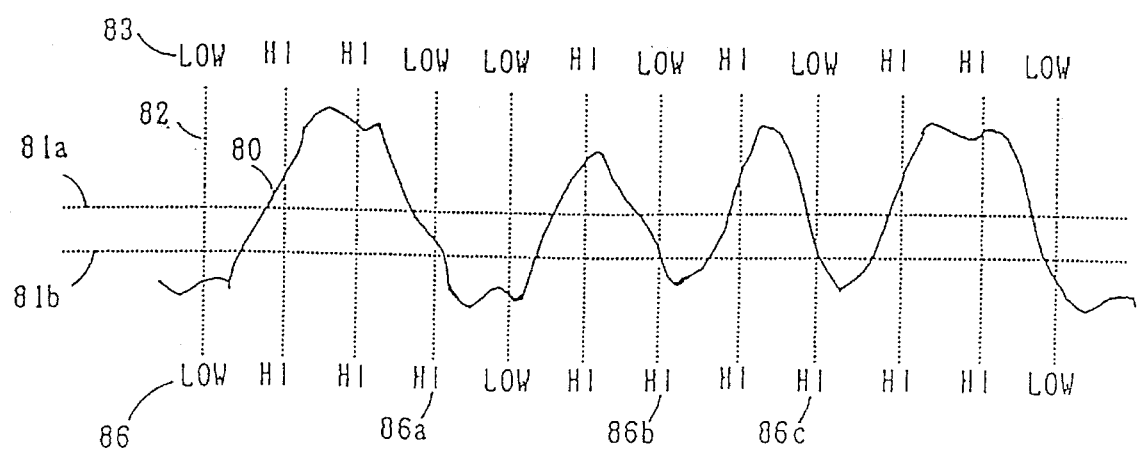
FIG. 3 shows a comparison between the HI and LOW outputs resulting from changes to the threshold level of the input waveform, according to the second embodiment of the present invention.

Referring to FIG. 1, FIG. 2 (a), FIG. 2 (b) and FIG. 3, the second embodiment of the present invention will now be described. FIG. 1 shows is the block diagram illustrating one specific embodiment of the automatic pattern synchronizing circuit. FIG. 2 (a) shows the mark rate measurement data versus the changing the delay time. FIG. 2 (b) is the plotting chart of the calculated average mark rate versus the changing delay time. FIG. 3 illustrates the timing chart of the input wave form and the different high and low points of the sampling data, which are compared by the comparator to the different comparison voltages.

As shown in FIG. 1, gate 19 inhibits the output of the reference pattern, and gate 20 that inhibits the output of the error rate detection divider 17. The control part 23 executes the following series operations automatically.

First, measurements of the high and low levels of the input pattern signal are made by changing the reference voltage of the reference voltage generator 12. This measurement process is similar to the previously described process used to measure of the high and low levels of the input pattern signal.

After the above described measurements are complete, the comparison voltage (for example, ¼ of the input voltage amplitude) 15 is set by the reference voltage generator 15, for detecting the mark ratio at the dead zone. In addition, the pulses are periodically counted by the error counter 18. The pulses, together with the changes to the delay time by the variable delay part 14, define the mark ratio.

As shown in FIG. 2, the dead zone is determined by comparing the peak region of the large variation in the mark ratio to the expected mark ratio that is calculated beforehand. The middle point of the dead zone is defined as the stable operation point, and it is set by the variable delay part. The execution of this series of operations is automatically realized by the control part 23.

Generally, the transient time, for both rising and falling times in the high frequency pattern, relatively increases. The following method includes the transient time and the relationship of the phases between the clock and high frequency patterns.

As shown in FIG. 3, the input analog pattern 80 is an example of the input pattern for the 50% mark ratio. Each sampling and strobe point taken by the clock is shown by a dotted line. An example of a sampling strobe point is the dotted line 82, which is in the dead zone.

In this first example, the mark ratio is measured at the half voltage point 81a that is set to the threshold voltage by the comparator 11. For this case, the output signal is shown as reference numeral 83. The number of highs is 6 and the number of lows is 6, which results in a calculated mark ratio of 0.5, as shown by reference numeral 84. This percentage (50%) is the same as the mark percent of the original input pattern. At this threshold voltage, it is difficult to detect the dead zone.

For the second example, the mark ratio is measured at the quarter voltage point 81b which is set to a lower threshold voltage than that used in the first example. For this case, the output signal is shown by reference numeral 86. Further, output signals 86a, 86b and 86c were changed to a high level output. The number of highs is 9 and the number of lows is 3, which results in a calculated mark ratio of 0.75, shown by reference numeral 87. This percentage (75%) is higher than the mark percentage of the original input pattern of 50%. Thus, the dead zone may be detected by using any suitable value for the threshold voltage of the comparator.

Next, the automatic measurement process is described.

First, the measurement of the HI and LOW voltages of the input analog pattern signal are made. For this case, the output of the reference pattern 44 is inhibited by the gate 19.

Figure 8:
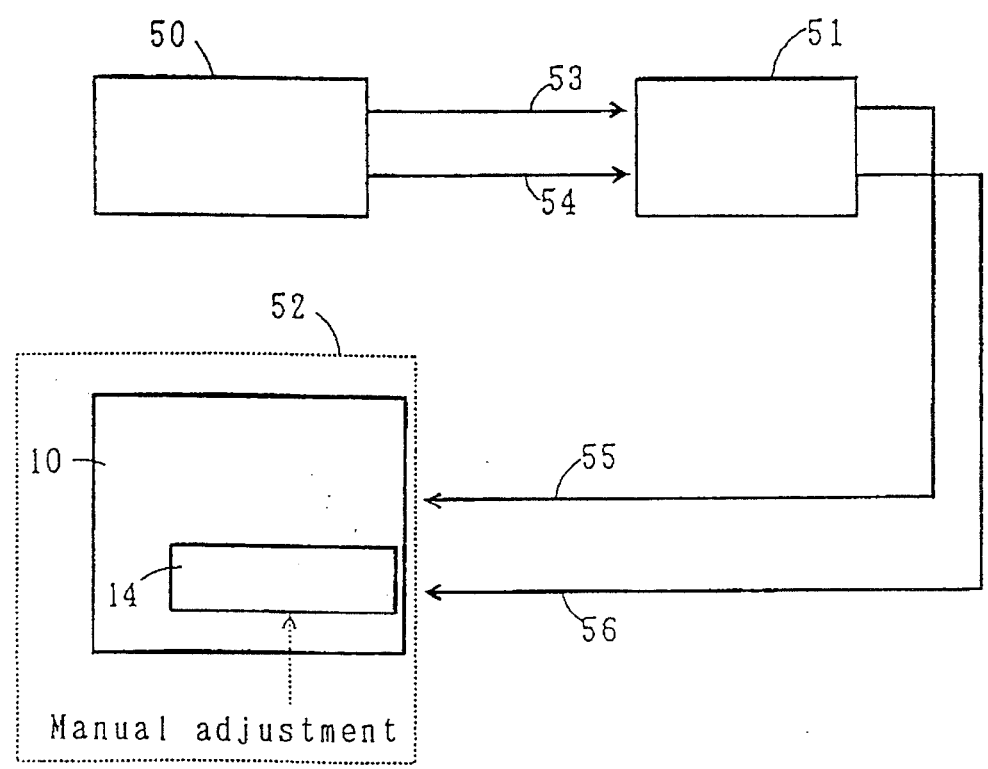
FIG. 8 shows a testing block for the DUT.
Figure 9:
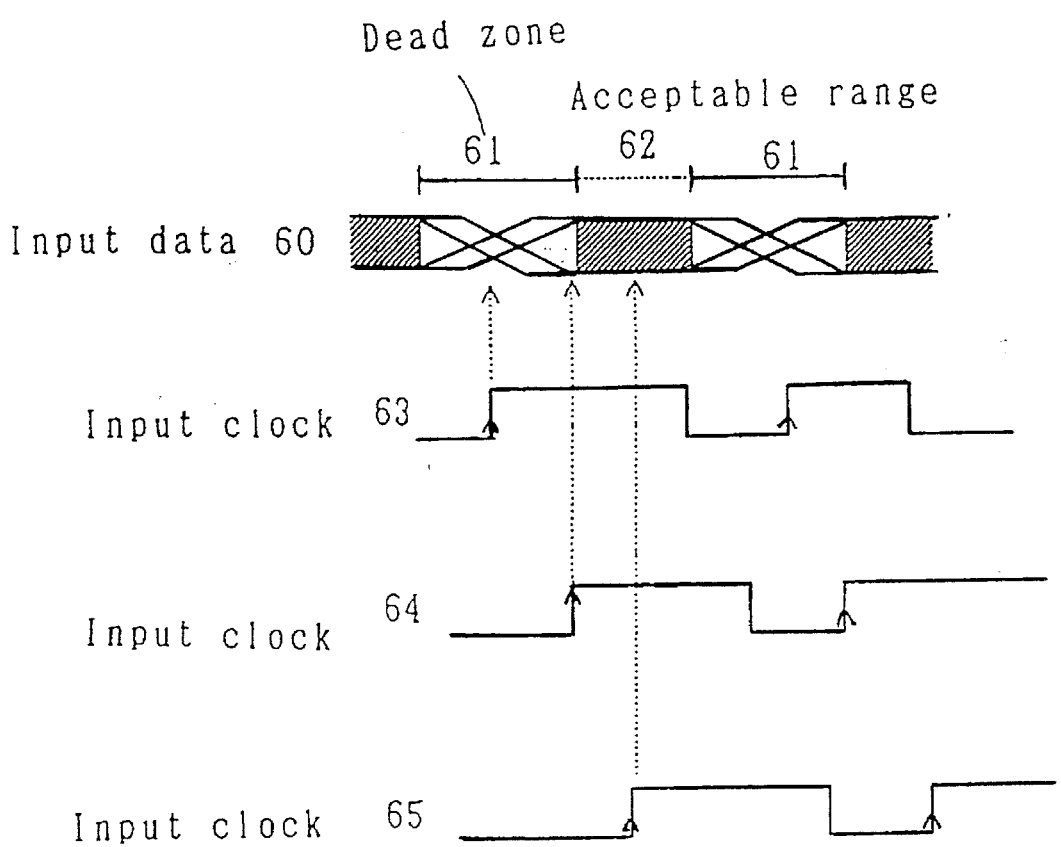
FIG. 9 illustrates the phase relationship between the input data and various clocks.

Next, the expected mark ratio MRKO of the output of the reference pattern generator 15 is generated. This pattern is similar to the output pattern of the generator 50, shown in FIG. 8.

Next, measurements of the HI and LOW voltages are made beginning at the minimum voltage that is set by the output voltage of the reference voltage generator 12. At this time, the output 43 is always a HI level, and the pulses are counted by the error counter 18.

Next, the output voltage of the reference voltage generator is incrementally increased.

The LOW level voltage is determined by increasing the voltage, which causes the middle point of the mark ratio to shift to the 100% mark. The percentage of the mark ratio MRKO is calculated utilizing the counting data of the error counter, as previously described.

The output voltage of the reference voltage is increased further. The HI voltage is then determined by increasing the voltage, resulting in the half value of the mark ratio MRKO that is calculated utilizing the counting data of the error counter, as described above.

The HI and LOW amplitude voltages of the input analog pattern signal are utilized to determine the reference voltage. This reference voltage enables one to detect the changes to the mark ratio at the dead zone.

The second measurement process includes the calculation of the percentage by changing the delay time of the variable delay part 14.

First, the variable delay part 14 is set at a minimum delay time. The percentage of the mark ratio is calculated. Each subsequent data measurement, which is counted by the error counter 18 at each time increment, is made according to the above mentioned first measurement process, as the delay time is incrementally increased. This measurement data is shown in FIG. 2 (a). The mark ratio data for this measurement is not stable, as is shown by reference numerals 62a and 66a in FIG. 2 (a), due to the short time measurement and the particular measurement pattern.

The measurement of the high frequency pattern is more unstable. For this case, a long measurement time is used or the averaged data taken over multiple measurement times is used. As shown in FIG. 2 (a), it is difficult to determine the dead zones of 71a and 72a from this data. Therefore, the data is processed and averaged, as shown in FIG. 2 (b).

The plot of the average mark ratio shown in FIG. 2 (b) is the result of averaging the measurement data shown in FIG. 2 (a).

The threshold value 75 is increased above the value of the expected percentage of mark ratio. Next, the peak values 63b and 65b are determined. These values are greater than the value of the expected percentage of the mark ratio and, thus, are clearly recognizable as boardering the dead zone.

The middle point 73 (b) located between 63b and 65b is, therefore, the stable operating point. The delay time of the variable delay part 14 is then set to this middle point value 73.

As explained above, the control part 23 analyzes the changing measurement data after each delay time. However, parallel measurements and analysis including calculation of the peak point of the mark ratio are possible.

The reduction in time is realized by the timely completion of the analysis process. As described above, the measurement of the known mark ratio of the reference pattern is made and the measurement of the unknown mark ratio is also made by a similar method, which includes setting the threshold level to that which is clearly determined from the peak values 63b and 65b of the dead zone.

The input pattern signal and the clock can also be synchronized in a similar manner. For this case, the pattern does not need to be the known input pattern, but may be an unknown pattern of the constant average mark ratio.

The present invention provides the following advantages.

Changes to the mark ratio at the dead zone are detected by setting the threshold voltage of the comparator 11 after measuring the input voltage. (Refer to FIG. 3–81b)

The position of the peak value of the dead zone, shown in FIG. 2 (b), is easily determined. The stable operating point, known as the middle point 73b, located between both of the two points of the dead zone is easily found.

The mark ratio for each delay time can be easily measured in a short period of time.

Therefore, this invention reduces the amount of time needed to complete pattern searching and pattern synchronization.

Having illustrated and described the principles of our invention with reference to several preferred embodiments, it should be apparent to those of ordinary skill in the art that such embodiments may be modified in detail without departing from such principles. We claim as our invention all such modifications that come within the true spirit and scope of the following claims.

What is claimed is:

1. An automatic pattern synchronizing circuit of an error detector comprising:
   a comparator which receives an input signal pattern to compare with a reference voltage;
   a reference voltage generator for providing said reference voltage to said comparator;
   a variable delay element for providing a delay time to a clock signal;
   a re-timing circuit which receives an output signal of said comparator to synchronize with said clock signal supplied through said variable delay element;
   an error counter which receives output pulses of said re-timing circuit and counts a number of said pulses per unit time with respect to said reference voltage;
   a gate circuit which inhibits a reference signal pattern from being provided to said error counter;
   a controlling part for controlling said reference voltage generator and said variable delay element in response to said counted pulses per unit time by said error counter.

2. An automatic pattern synchronizing circuit as defined in claim 1, wherein said re-timing circuit is formed of a flip-flop circuit triggered by said clock signal provided through said variable delay element.

3. An automatic pattern synchronizing circuit as defined in claim 1 further includes an error detector provided between said re-timing circuit and said error counter and a reference pattern generator which generates said reference signal pattern.

4. An automatic pattern synchronizing circuit as defined in claim 3, wherein said controlling part instructs said gate circuit to pass said reference signal pattern to said error detector after said reference voltage to said comparator and said delay time in said variable delay time are determined.

5. An automatic pattern synchronizing circuit as defined in claim 3, wherein said error counter and said controlling part monitor a mark rate of said pulses from said error detector, where said mark rate is a ratio of pulse numbers in either high or low output of said comparator versus a sum of said high and low outputs of said comparator for a predetermined time period.

6. An automatic pattern synchronizing circuit as defined in claim 3, said mark rate is monitored by changing said reference voltage to said comparator and said delay time in said variable delay element.

7. A method of automatically synchronizing a clock pattern and a reference pattern with an input pattern, comprising the following steps of:
   providing said input pattern to a comparator which compares said input pattern with a threshold level;
   measuring the amplitude of said input pattern by changing said threshold level of said comparator;
   optimizing said threshold level of said comparator to easily detect a series of pulse signals from said comparator;
   supplying said pulse signals to an error counter in synchronism with said clock pattern, said clock pattern being provided with a delay time through a variable delay element;
   measuring said pulse signals per unit-delay-time utilizing said error counter with reference to said reference pattern by changing said delay time;
   detecting at least two peak points from said pulse signals per unit delay time measured by said error counter; and
   fixing the delay time of said variable delay element to a middle of said two peak points.

* * * * *